(12) United States Patent
Gates et al.

(10) Patent No.: US 12,264,564 B1
(45) Date of Patent: Apr. 1, 2025

(54) IN-SITU PROCESS TO PRODUCE HYDROGEN-BEARING GAS FROM UNDERGROUND PETROLEUM RESERVOIRS

(71) Applicant: PROTONH2 ANALYTICS, LIMITED, Dublin (IE)

(72) Inventors: Ian Gates, Calgary (CA); Jingyi Wang, Calgary (CA)

(73) Assignee: ProtonH2 Analytics, Limited, Dublin (IE)

( * ) Notice: Subject to any disclaimer, the term of this patent is extended or adjusted under 35 U.S.C. 154(b) by 0 days.

(21) Appl. No.: 18/834,825

(22) PCT Filed: Jan. 31, 2024

(86) PCT No.: PCT/US2024/013898
§ 371 (c)(1),
(2) Date: Jul. 31, 2024

Related U.S. Application Data

(60) Provisional application No. 63/602,352, filed on Nov. 22, 2023.

(51) Int. Cl.
*E21B 43/24* (2006.01)
*C01B 3/12* (2006.01)
(Continued)

(52) U.S. Cl.
CPC ............. *E21B 43/24* (2013.01); *C01B 3/12* (2013.01); *C01B 3/36* (2013.01); *C01B 3/38* (2013.01); *E21B 43/168* (2013.01); *E21B 36/00* (2013.01)

(58) Field of Classification Search
CPC ...... E21B 43/24; E21B 43/243; E21B 43/164; E21B 43/30; E21B 41/0057;
(Continued)

(56) References Cited

U.S. PATENT DOCUMENTS 5,415,231 A    5/1995  Northrop et al.
6,805,194 B2  10/2004  Davidson et al.
(Continued)

FOREIGN PATENT DOCUMENTS

CA    2876765      3/2015
CN    112196505 A  1/2021
(Continued)

OTHER PUBLICATIONS

ISA/US, International Search Report and Written Opinion of the International Searching Authority, May 8, 2024.
(Continued)

*Primary Examiner* — Zakiya W Bates
(74) *Attorney, Agent, or Firm* — Mertzlufft Law PLLC dba Stake; Joshua D. Mertzlufft, Esq.

(57) ABSTRACT

Implementations relate to treatment of a petroleum reservoir to produce a hydrogen-bearing gas. Implementations may include methods and systems for processing a reservoir to generate hydrogen in-situ and produce a large fraction of the generated hydrogen to the surface. Processing the reservoir may include injecting oxygen into the reservoir to enable combustion within the reservoir to create heat and carbon monoxide in the reservoir. The heat may generate steam from both boiling of in-situ formation water and steam generated from the oxidation reactions. The generated heat may enable gasification, steam reforming, and aquathermolysis reactions and both the heat and carbon monoxide enables the water-gas shift reaction. Each such reaction may generate hydrogen within the reservoir.

20 Claims, 11 Drawing Sheets

(51) Int. Cl.
*C01B 3/36* (2006.01)
*C01B 3/38* (2006.01)
*E21B 36/00* (2006.01)
*E21B 43/16* (2006.01)

(58) Field of Classification Search
CPC .... E21B 36/008; E21B 43/16; E21B 43/2406; E21B 43/168
See application file for complete search history.

(56) References Cited

U.S. PATENT DOCUMENTS

| | | |
|---|---|---|
| 7,431,084 B1 | 10/2008 | Upadhye |
| 7,669,657 B2 | 3/2010 | Symington et al. |
| 7,836,957 B2 | 11/2010 | Singleton et al. |
| 8,763,697 B2 | 7/2014 | Surguchev |
| 9,085,972 B1 | 7/2015 | Hill |
| 9,284,827 B2 | 3/2016 | Canas et al. |
| 9,605,522 B2 | 3/2017 | Zubrin |
| 11,530,603 B2 | 12/2022 | Gates et al. |
| 11,781,229 B2 | 10/2023 | Amaya |
| 2002/0033255 A1 | 3/2002 | Fowler et al. |
| 2003/0080604 A1 | 5/2003 | Vinegar et al. |
| 2003/0131995 A1 | 7/2003 | De Rouffignac et al. |
| 2003/0141065 A1 | 7/2003 | Karanikas et al. |
| 2003/0146002 A1 | 8/2003 | Vinegar et al. |
| 2003/0178191 A1 | 9/2003 | Maher et al. |
| 2003/0192693 A1 | 10/2003 | Wellington |
| 2008/0289820 A1 | 11/2008 | De Francesco |
| 2008/0296018 A1 | 12/2008 | Zubrin et al. |
| 2009/0065211 A1 | 3/2009 | Flinn et al. |
| 2012/0138316 A1 | 6/2012 | Matzakos |
| 2013/0062058 A1 | 3/2013 | Sultenfuss et al. |
| 2014/0190691 A1 | 7/2014 | Vinegar et al. |
| 2014/0305640 A1 | 10/2014 | Wellington et al. |
| 2015/0114645 A1 | 4/2015 | Parsche |
| 2015/0247818 A1 | 9/2015 | Silvester et al. |
| 2016/0084051 A1 | 3/2016 | Vinegar et al. |
| 2019/0017358 A1 | 1/2019 | Morse et al. |
| 2020/0182019 A1 | 6/2020 | Wang et al. |
| 2021/0047905 A1 | 2/2021 | Strem et al. |
| 2021/0189856 A1 | 6/2021 | Gates et al. |
| 2022/0034258 A1 | 2/2022 | Aikman |
| 2023/0392485 A1 | 12/2023 | Johnson |

FOREIGN PATENT DOCUMENTS

| | | |
|---|---|---|
| GB | 2391890 | 2/2004 |
| WO | 2008051495 | 5/2008 |
| WO | 2022126257 | 6/2022 |

OTHER PUBLICATIONS

Trent Jacobs, Canadian Operator Works To Transform an Oil Field Into a Hydrogen Factory, Mar. 1, 2021.

Edison Group, Hydrogen from oil reservoirs—utilising in-situ combustion to exclusively produce hydrogen, Feb. 3, 2023.

IN-SITU PROCESS TO PRODUCE HYDROGEN-BEARING GAS FROM UNDERGROUND PETROLEUM RESERVOIRS

CROSS REFERENCE TO RELATED APPLICATIONS

This application is a U.S. national stage application of PCT/US2024/013898, filed 31 Jan. 2024, which claims priority to U.S. Provisional Application No. 63/602,352, filed on 22 Nov. 2023, the entire disclosures of which are hereby incorporated by reference.

BACKGROUND

Oil is a naturally occurring, unrefined petroleum product comprising hydrocarbon components. Oil may be described as heavy oil, extra heavy oil, or bitumen, which can be distinguished from each other based on densities and viscosities. For example, heavy oil may be classified as having a density of which is between 920 and 1000 kg/m3, and extra heavy oil or bitumen may be classified as having a density greater than 1000 kg/m3. Oil may additionally include non-hydrocarbon elements entrained in the oil through, for example, suspension, sorption, emulsion, molecular bonding, or other means, which can be co-produced or mobilized by or with the oil.

A petroleum reservoir may include subsurface formations comprising porous matrices, which may comprise petroleum products including oil and gas. Examples of petroleum reservoirs include heavy oil reservoirs and oil sands reservoirs. A heavy oil reservoir may be a petroleum reservoir comprising porous rock that includes heavy oil. An oil sands reservoir may be a petroleum reservoir comprising porous rock that includes extra heavy oil or bitumen. Petroleum reservoirs may also include a water phase, which may refer to the interstitial water present in the porous reservoir rock.

Numerous oil and gas reservoirs are widely distributed across the globe, and many technologies are employed for the extraction of oil or gas from these reservoirs. These technologies encompass primary extraction methods, as well as enhanced oil recovery processes, including but not limited to water flooding, steam flooding, and chemical flooding, all aimed at augmenting the production of additional hydrocarbons from conventional oil and gas reservoirs.

SUMMARY

This Summary is intended to introduce, in an abbreviated form, various topics to be elaborated upon below in the Detailed Description. This Summary is not intended to identify key or essential aspects of the claimed invention. This Summary is similarly not intended for use as an aid in determining the scope of the claims.

This Summary is intended to introduce, in an abbreviated form, various topics to be elaborated upon below in the Detailed Description. This Summary is not intended to identify key or essential aspects of the claimed invention. This Summary is similarly not intended for use as an aid in determining the scope of the claims.

A method for treating an oil or gas reservoir to recover a hydrogen-bearing gas may comprise: drilling a well including a wellbore into an reservoir (e.g., an oil or gas reservoir); performing a pre-heat stage, including pre-heating the reservoir by injecting steam into the well to create a depletion chamber within the reservoir; performing an injection stage, including injecting an oxygen-bearing gas via the well via the depletion chamber into the reservoir to yield an in-situ reactor zone where the hydrocarbons including oil and gas are combusted to generate heat, steam, and carbon oxide (e.g., carbon monoxide, carbon dioxide) gas components; allowing gasification, steam-reforming, water-gas shift, and aquathermolysis reactions to occur in the reservoir; stopping the injection of oxygen-bearing gas into the reservoir when the temperature of the near wellbore (e.g., a location near the wellbore) has reached a target temperature; performing a soak stage, including allowing a period of time for the remaining oxygen in the reservoir to be consumed and the reactions occurring in the reservoir generate more hydrogen; performing a production stage, including putting the well on production to yield a producing well producing fluids to the surface where hydrogen is one component of the produced fluids; and continuing production through the well until the gas or hydrogen production rate has dropped below a target value after which the producing well is shut in.

The process of injection of steam or oxygen-bearing gas or both through injection wells (the injection stage), shutting in the previous injection wells (the soak stage), and then putting the prior injection wells on production (the production stage) may be done in a repeated set of cycles.

The hydrogen from the reactions that occur within the reservoir during steam and/or oxygen-bearing gas injection period and the shut-in period after injection may be maintained in the region surrounding the well so it is readily produced from the region surrounding the well during the production period.

Multiple grouped injection wells and multiple grouped production wells may be operated to control the pressure within the reservoir to enhance the production of hydrogen from the reservoir.

Injection of steam or oxygen-bearing gas into the reservoir into multiple grouped wells may be done to create a high pressure connected zone within the reservoir and production of fluids from multiple grouped wells from the reservoir may be done to create a low pressure connected zone within the reservoir and the pressure gradient between the high pressure connected zone and the low pressure connected zone may lead to greater hydrogen production from the reservoir.

After the in-situ reactors of the wells are communicating with respect to fluid exchange, a group of wells may be converted to continuous injection of steam or oxygen (e.g., in air or enriched air) and another group of wells may be converted to continuous production of fluids including hydrogen from the reservoir.

An oxidant such as nitrous oxide and hydrogen peroxide may be used together with or instead of oxygen-bearing gas. Hot water may be used together with or instead of steam.

Injection or production wells may be vertical wells, deviated wells, horizontal wells, multilateral wells, or combinations of these wells.

Thermocouples may be placed within the wells to monitor the process operation.

The pre-heat stage may end, for example, when the injection well temperature has reached to above 40% of the value of the saturated steam temperature and preferably above 60% of the value of the saturated steam temperature.

The injection stage may end, for example, when the injection well temperature has exceeded the lower of 400° C. or 200° C. above the saturated steam temperature used in the pre-heat stage.

The soak stage may end, for example, when the well temperature has dropped to the higher of 300° C. or 50° C. below the peak temperature achieved in the injection stage.

The injection stage may end, for example, just after the point of time when the well pressure has peaked.

BRIEF DESCRIPTION OF THE FIGURES

For a fuller understanding of the nature and objects of the disclosure, reference should be made to the following detailed description taken in conjunction with the accompanying drawings, which are described in brief here.

DETAILED DESCRIPTION

Figure 1:
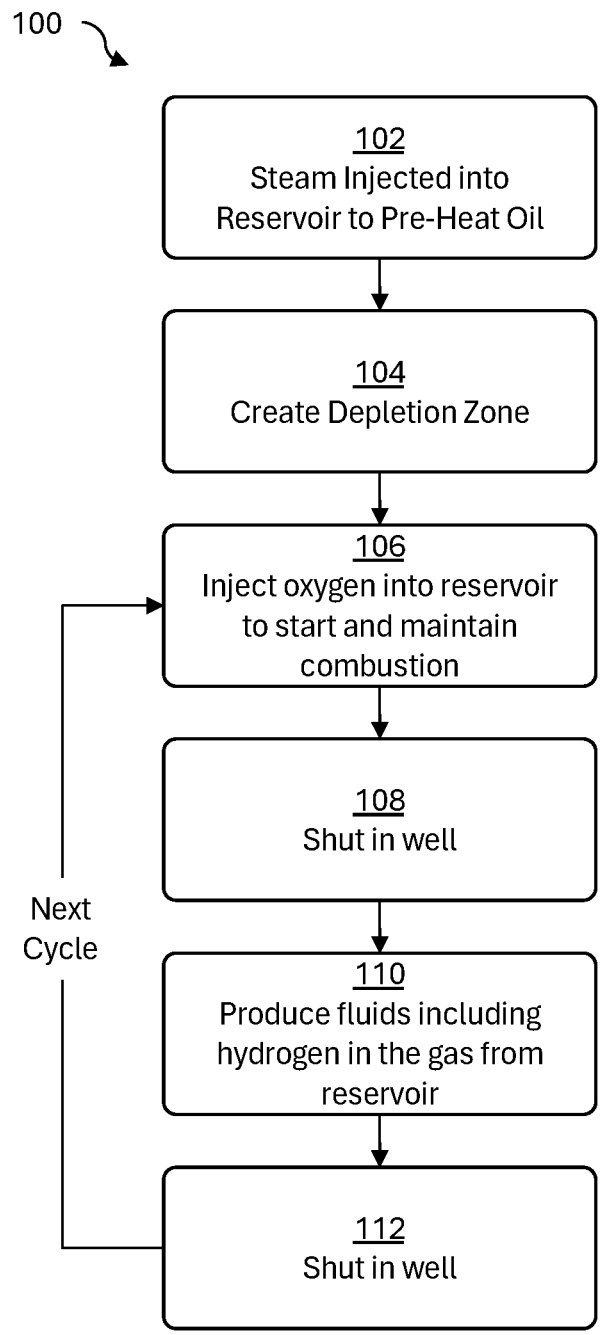
FIG. 1 illustrates a method 100 for the production of hydrogen from an oil reservoir, according to one or more implementations herein.

It is to be understood that the invention is not limited in its application to the details of construction and the arrangements of components and/or method steps set forth in the following description or illustrated in the drawings, and phraseology and terminology used herein is for the purpose of description and should not be regarded as limiting. The invention is capable of other embodiments and of being practiced or being carried out in various ways. Accordingly, other aspects, advantages, and modifications will be apparent to those skilled in the art to which the invention pertains, and these aspects and modifications are within the scope of the invention, which is limited only by the appended claims.

Globally, there is an ongoing need to produce energy and to store energy. Hydrogen ($H_2$) is pursued globally as a versatile and clean energy carrier in the context of addressing climate issues. Hydrogen holds significant potential as a sustainable energy source due to its capacity to store and deliver energy efficiently, especially in applications such as transportation and industrial processes. It has the capacity to reduce greenhouse gas emissions when produced using low-carbon methods, such as electrolysis powered by renewable energy sources. By embracing hydrogen as an alternative to fossil fuels, the adverse impacts of climate change can be mitigated, moving humanity towards a more sustainable and environmentally responsible energy landscape. However, the production, transportation, and utilization of hydrogen should also align with stringent environmental standards to fully realize its potential to mitigate climate issues and foster a greener future.

In a state ready for end-use, hydrogen is a clean fuel-its end use yields no greenhouse gases as the only product is water. Hydrogen has high energy density and the ability to release that energy when needed making it a viable option for long-term energy storage. When consumed in fuel cells or hydrogen turbines, hydrogen can be converted back into electricity and heat with minimal environmental impact, offering a clean and efficient energy solution.

Hydrogen is also needed as a feedstock material for chemicals. In this application also, hydrogen may contribute to changing the chemical industry and a more sustainable and environmentally friendly future. Hydrogen, when used in various chemical processes, may enable the production of a wide range of chemicals such as ammonia, methanol, and various petrochemicals.

Hydrogen may be found within all three phases of hydrocarbon-containing oil and gas systems (e.g., oil, gas, and water).

Oils (e.g., heavy oils, extra heavy oils, bitumen, or other oils) can be cold produced under solution gas foamy oil flow in systems having a viscosity lower than about 50,000 cP. For systems with original oil viscosity greater than about 50,000 cP, the inherent viscosity of the oil at its natural reservoir conditions, for example, at a natural reservoir temperature (i.e., an ambient temperature of a cold or unheated reservoir), renders extracting oil using traditional techniques impractical. Therefore, heavy oil and bitumen conventionally undergo thermal treatment to reduce their viscosity, facilitating enhanced reservoir mobility and enabling extraction to the surface. Furthermore, this thermal treatment promotes improved fluid (e.g., liquid or gas) flow within the reservoir.

Following the extraction of heavy oil and bitumen, these products are conventionally subjected to an upgrading process, whereby they are transformed into synthetic crude oil. Subsequently, the synthetic crude oil undergoes refining processes, ultimately yielding transportation fuels and feedstocks essential for the petrochemical industry. When the fuel is combusted for generation of heat or in combustion engines, it generates greenhouse gas emissions, namely carbon dioxide emissions, which are released to the atmosphere.

One conventional method of producing hydrogen is steam methane reforming (SMR). SMR is an industrial process for producing hydrogen and is often employed in the production of hydrogen for various industrial applications. In this process, natural gas, primarily composed of methane ($CH_4$), is combined with high-temperature steam in the presence of a catalyst to produce hydrogen gas ($H_2$) and carbon dioxide ($CO_2$). While SMR can be efficient and cost-effective, it has notable environmental shortcomings. One shortcoming of SMR is the release of carbon dioxide, a potent greenhouse gas, into the atmosphere as a by-product of the reaction. The environmental impact of SMR is exacerbated when the natural gas feedstock is derived from fossil fuel sources, which further contributes to carbon emissions and climate change. These emissions can be offset somewhat using carbon capture and sequestration technologies, though such technologies require additional equipment and energy to operate.

Another conventional method of producing hydrogen is electrolysis. Electrolysis is a chemical process that involves the use of electrical energy to split water molecules into hydrogen and oxygen gases, which can then be harnessed as a clean fuel source. This method may reduce carbon emissions, since hydrogen, when used as an energy carrier, produces no greenhouse gases. However, electrolysis has several shortcomings that impact its viability. Electrolysis's dependence on input electricity ties its environmental benefits to its source of electricity. If the ultimate source of the electricity used includes burning fossil fuels, the process may inadvertently contribute to emissions. Furthermore, the efficiency and cost of electrolysis technologies make it less economical compared to conventional fossil fuels.

Implementations herein relate to treatment of a petroleum reservoir (e.g., conventional oil, heavy oil, extra heavy oil, oil sands, and carbonate oil reservoirs) to produce a hydrogen-bearing gas. Implementations may include methods and systems for processing a reservoir to generate hydrogen in-situ (e.g., the environment of a subsurface petroleum reservoir) and produce a large fraction of the generated hydrogen to the surface. Processing the reservoir may include injecting oxygen (e.g., in air or enriched air) into the reservoir to enable combustion within the reservoir to create heat and carbon monoxide in the reservoir. The heat may generate steam (e.g., water vapor) from both boiling of in-situ formation water and steam generated from the oxidation reactions. The generated heat may enable gasification, steam reforming, and aquathermolysis reactions and both the heat and carbon monoxide enables the water-gas shift reaction. Each such reaction may generate hydrogen within the reservoir. Adverse reactions also exist that consume hydrogen including the hydrogen combustion reaction (e.g., hydrogen and oxygen may react to produce water) and methanation reactions (e.g., coke and heavy hydrocarbons may react to produce methane).

Implementations solve many of the shortcomings of conventional solutions of hydrogen energy production, including less carbon-intensive production of hydrogen that can be stored and is consumed cleanly. Implementations may also yield feedstock hydrogen for chemicals such as methanol and ammonia or use in refining. In this way, implementations enable further exploitation of petroleum reservoirs as sources of fuel, which can be combusted in-situ to generate heat and carbon oxides to enable the production of hydrogen within the petroleum reservoir.

In situ combustion and in-situ gasification of oil within oil reservoirs enables production of a gas mixture including hydrogen as a component. The other gas components of the gas mixture may include, for example, carbon dioxide, carbon monoxide, water (e.g. water vapor), methane, hydrogen sulfide, and other gases that result from combustion reactions in the reservoir.

The combustion reactions generate heat, steam, and carbon oxides, among other products. The heat also generates additional steam from the formation water that was contained in the reservoir. The heat and carbon monoxide enable the water-gas shift reaction which generates hydrogen within the reservoir. Aquathermolysis (hydrous pyrolysis), gasification, and steam reforming reactions also generate additional hydrogen. The heat generated by the combustion reactions also enable thermal cracking (pyrolysis, e.g., splitting larger hydrocarbon chains into smaller-chained compounds) that may lead to the formation of carbon-rich residues such as coke within the formation.

Implementations may maximize the hydrogen generation reactions, minimize the hydrogen consumption reactions, and produce the generated hydrogen from the reservoir to the surface (e.g., the earth's surface).

Implementations may utilize wells. A well may pass through the surface and an overburden and into a reservoir. Below (e.g., deeper than) the reservoir may be understrata. The well may include a wellbore, which may include a hole, which may be, for example, drilled using a well drilling system. The well may be, for example, a vertical well, a horizontal well, a straight well, a vertical-to-horizontal well, or the like.

Hydrogen may be derived from the reactions' generated heat and carbon monoxide. Reactions that generate hydrogen may utilize heat resulting from steam and the energy conditions generated in the petroleum reservoir. Implementations may create a reactive zone to generate heat and carbon monoxide. Steam can be generated from the heat or the oxidation reactions or can be added to the reservoir via injection from the surface. In some implementations, the reactive zone may be contained such that as hydrogen is generated, oxygen does not contact—or otherwise minimally contacts—the hydrogen and consume it.

In implementations herein, the injection and production cycle lengths may be controlled so that during injection of oxygen (e.g., in air or enriched air) or steam or both, injection may be maintained to create sufficient heat and carbon monoxide in the reservoir but may be stopped when the hydrogen concentration rises in the reservoir and can be consumed by the injected oxygen. Thereafter, production may occur and continue until the production rate of hydrogen drops below an economic threshold. Thereafter, injection of oxygen (e.g., in air or enriched air) or steam or both may resume, beginning a new cycle.

In another implementation, a flammable material can be placed within the reservoir before or during the process to enable higher temperature and generation of combustion products and reaction products, including, for example, carbon monoxide, steam (water), and hydrogen, within the reservoir.

Adverse reactions may also occur that consume the generated hydrogen. This includes hydrogen combustion with the injected oxygen and methanation reactions where the hydrogen reacts with coke to form methane. These reactions consume the generated hydrogen and as such, reduce the amount of hydrogen that may be produced to the surface and harm the ability of the process with respect to hydrogen production.

Figure 2:
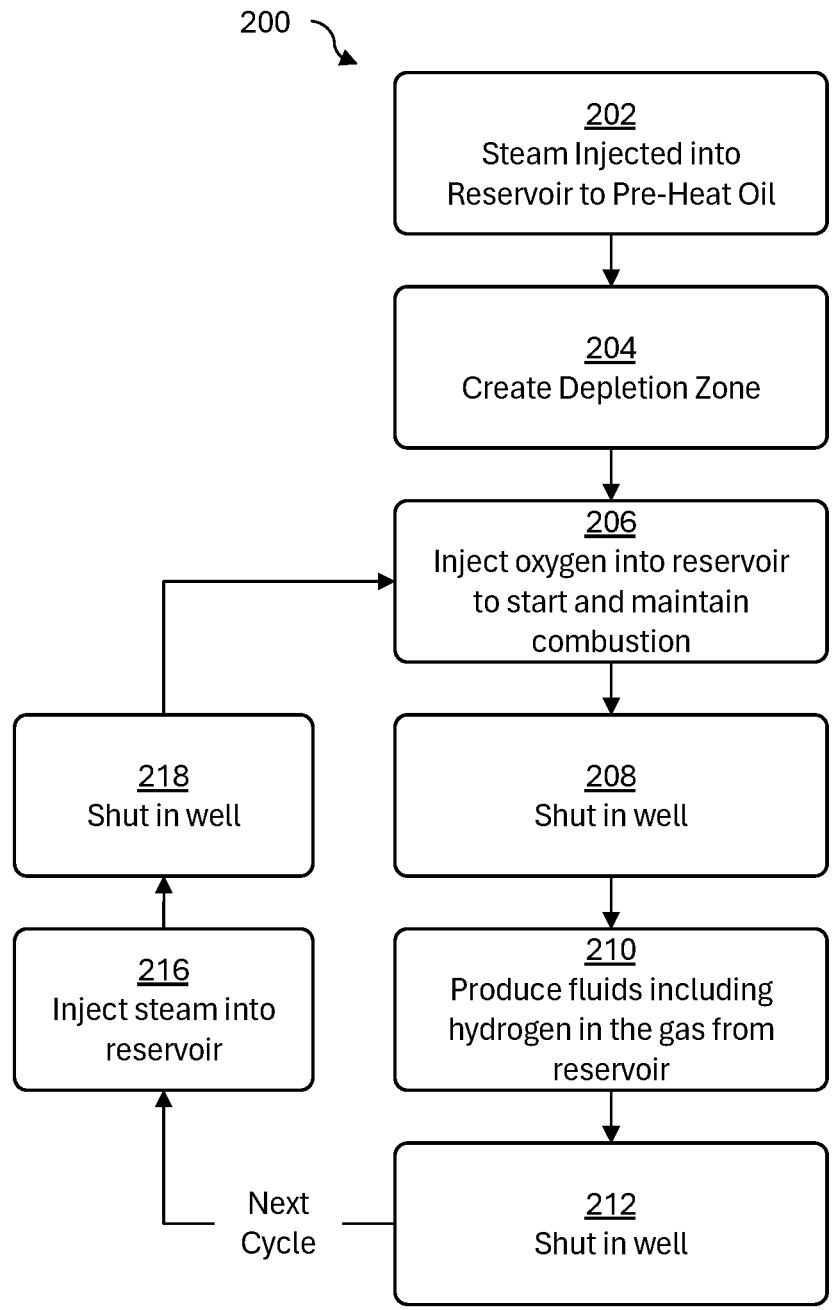
FIG. 2 illustrates another method 200 for the production of hydrogen from an oil reservoir, according to one or more implementations herein.
Figure 3:
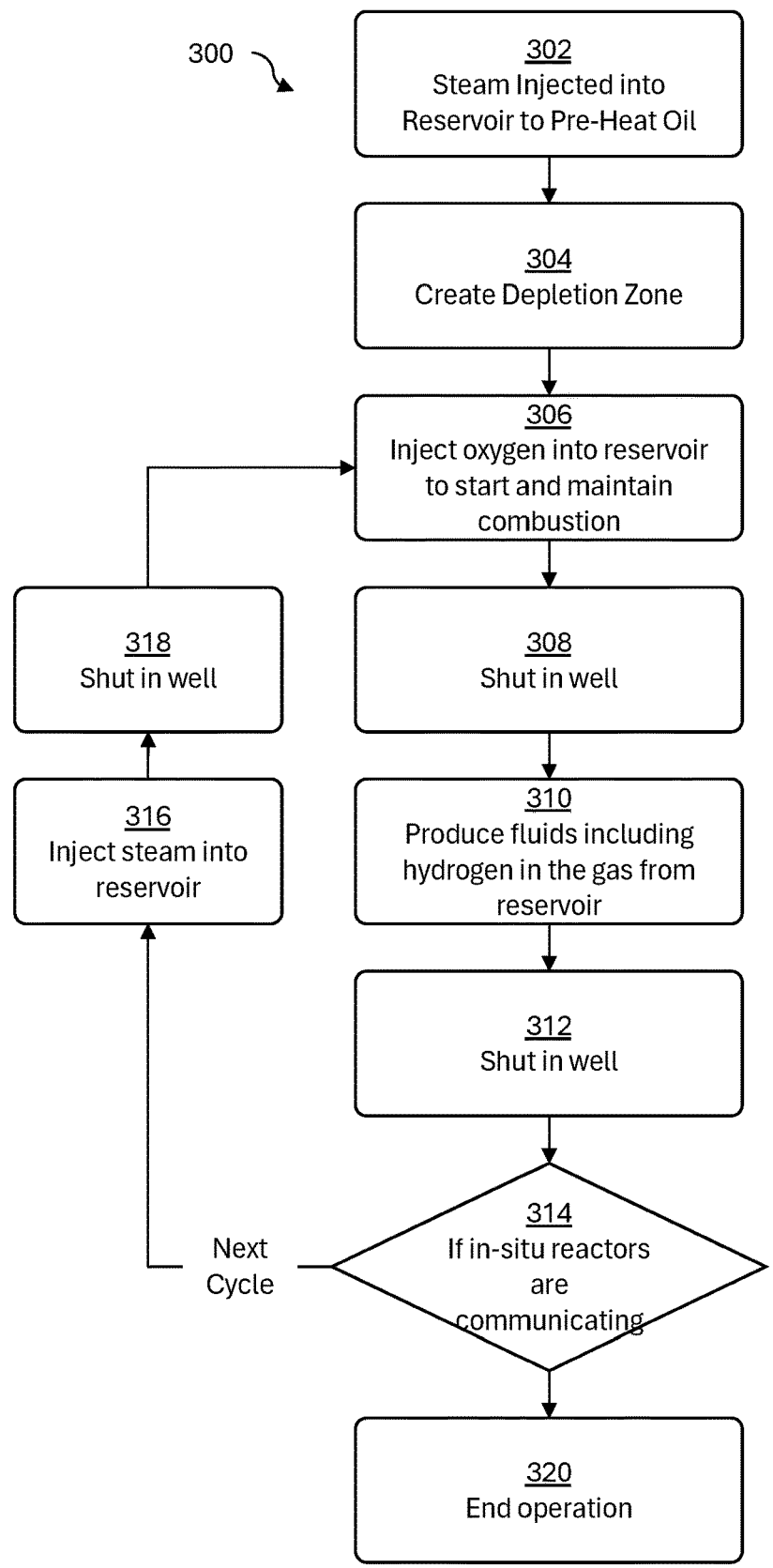
FIG. 3 illustrates another method 300 for the production of hydrogen from an oil reservoir, according to one or more implementations herein.

The methods illustrated in FIGS. 1-3 may be implemented to create an in-situ reactor where combustion, gasification, aquathermolysis, and water-gas reactions occur but an optimal amount of oxygen is injected such that it does not consume a significant amount of the generated hydrogen.

FIG. 1 illustrates a method 100 for the production of hydrogen from an oil reservoir, according to one or more implementations herein.

An operation 102 may include injecting steam into a reservoir to pre-heat the oil therein, and may be performed alone or in combination with one or more other operations depicted in FIG. 1. This steam may pre-heat the region around the wells. It will be understood that this injection may include the injection of steam into the reservoir or the circulation of steam within the well. The temperature of the near well region may be monitored by using thermocouples placed in the wells.

An operation 104 may include creating a depletion zone (e.g., depletion chamber) within the reservoir, and may be performed alone or in combination with one or more other operations depicted in FIG. 1. This depletion zone may be where reservoir fluids (e.g., pre-production fluids), including petroleum, are produced to the surface. A depletion zone is a region of the reservoir where the oil has been depleted from the zone, which after depletion comprises gases (e.g., steam) and water. This can be accomplished by steam injection, referred to as steam stimulation, at the start of the process where the steam mobilizes the oil, that is, steam heating of the oil lowers its viscosity making it easier to flow as is done in operation 102. In a process where there are separate injection and production intervals (e.g., there is not a single well process where the same perforations are used for both injection and production), steam can be injected from one of the intervals to the other one to displace the mobilized oil from the reservoir to create a depletion zone.

In some implementations, multiple cycles of steam injection and production may be done to create the depletion zone.

In some implementations, hot water can be injected instead of steam to create the depletion zone.

For single well processes where the same perforations are used for injection and production, the depletion zone can be established by using a cyclic stimulation process where repeated injection and production periods are done until a depletion zone has been created around the well.

The extent of the depletion chamber can be established from the amount of produced oil that is removed from the reservoir during the period of time during steam stimulation. The extent of the depletion zone may in an exemplary implementation be greater than one-third the length of the perforated interval of the well and more than one-half the length of the perforated interval of the well.

An operation 106 may include injecting oxygen into the reservoir to start and maintain combustion and may be performed alone or in combination with one or more other operations depicted in FIG. 1. The oxygen (e.g., in air or enriched air or pure component), may be injected into the reservoir through the well (e.g., a vertical, deviated, horizontal, or other well) to create an in-situ reactor.

In some implementations, the oxygen is injected into the reservoir at elevated temperature to help initiate the combustion reactions within the reservoir and enhance heat transfer into the reservoir.

After the depletion zone has been established, then oxygen (e.g., in air or in enriched air or pure oxygen) may be injected into the reservoir and the temperature in the well may be monitored. The oxidation reaction may generate hot gases with temperatures above, for example, 500° C. and thus when oxidation is occurring, if one or more of the thermocouples in the well reach and are maintained at over, for example, 400° C., then the oxidation process may be generating heat within the formation. The pressure may also be observed and when the pressure achieves a near constant value, either at a specified maximum value with consequent reduction of flow or a steady or quasi steady value that does not change significantly while injection occurs, the oxidation process may be generating heat within the formation. After these conditions are met, then oxygen injection stops, and the well is shut in at operation 108.

An operation 108 may include shutting in the well and may be performed alone or in combination with one or more other operations depicted in FIG. 1. This operation 108 may stop the flow of injected oxygen, which leads to a slowing and eventual cessation of combustion within the well once the oxygen within the well is consumed. For example, when the temperature of the well has been sustained for more than 5 days above 400° C., then a large enough reactive combustion zone exists around the well and oxygen injection is then stopped. After the completion of combustion within the well, heat continues to enable the water-gas shift reaction until the temperature drops and hydrogen generation stops.

An operation 110 may include producing fluids including hydrogen-bearing gas (e.g., production fluids) from the reservoir, and may be performed alone or in combination with one or more other operations depicted in FIG. 1. This production of fluids to the surface may continue until, for example, production reaches a non-economical rate. The production may begin, for example, after a period of time being a target time or sufficient time for a temperature drop to occur. Production may be to the surface of the well.

An operation 112 may include shutting in the well and may be performed alone or in combination with one or more other operations depicted in FIG. 1. Operation 112 may be completed, for example, when hydrogen production drops below a threshold value, for example, determined by economics of the process. The cycle may then be repeated by returning to operation 106. In this way, oxygen injection may begin again and the cycle of operations 106-112 repeats.

FIG. 2 illustrates another method 200 for the production of hydrogen from an oil reservoir, according to one or more implementations herein. Steam is injected for a period before each cycle to heat the wellbore and near well region prior to the next cycle of oxygen injection.

An operation 202 may include injecting steam into a reservoir to pre-heat the oil therein and may be performed alone or in combination with one or more other operations depicted in FIG. 2. Operation 202 may be similar to operation 102.

An operation 204 may include creating a depletion zone (e.g., depletion chamber) within the reservoir, and may be performed alone or in combination with one or more other operations depicted in FIG. 2. Operation 204 may be similar to operation 104.

An operation 206 may include injecting oxygen into the reservoir to start and maintain combustion and may be performed alone or in combination with one or more other operations depicted in FIG. 2. Operation 202 may be similar to operation 106.

An operation 208 may include shutting in the well and may be performed alone or in combination with one or more other operations depicted in FIG. 2. Operation 208 may be similar to operation 108.

An operation 210 may include producing fluids including hydrogen in the gas from the reservoir and may be performed alone or in combination with one or more other operations depicted in FIG. 2. Operation 210 may be similar to operation 110.

An operation 212 may include shutting in the well and may be performed alone or in combination with one or more other operations depicted in FIG. 2. Operation 212 may be similar to operation 112.

An operation 216 may include injecting steam into the reservoir and may be performed alone or in combination with one or more other operations depicted in FIG. 2. This steam injection may continue until a target temperature is reached, after which the well may be shut in at operation 218. Operation 216 may heat and stimulate the well in preparation for the oxygen injection of the next cycle.

An operation 218 may include shutting in the well and may be performed alone or in combination with one or more other operations depicted in FIG. 2. The cycle may then be repeated by returning to operation 206. In this way, oxygen injection may begin again and the cycle of operations 206-218 repeats.

FIG. 3 illustrates another method 300 for the production of hydrogen from an oil reservoir, according to one or more implementations herein.

An operation 302 may include injecting steam into a reservoir to pre-heat the oil therein and may be performed alone or in combination with one or more other operations depicted in FIG. 3. Operation 302 may be similar to operations 102 or 202.

An operation 304 may include creating a depletion zone (e.g., depletion chamber) within the reservoir, and may be performed alone or in combination with one or more other operations depicted in FIG. 3. Operation 304 may be similar to operations 104 or 204.

An operation 306 may include injecting oxygen into the reservoir to start and maintain combustion and may be performed alone or in combination with one or more other operations depicted in FIG. 3. Operation 302 may be similar to operations 106 or 206.

An operation 308 may include shutting in the well and may be performed alone or in combination with one or more other operations depicted in FIG. 3. Operation 308 may be similar to operations 108 or 208.

An operation 310 may include producing fluids including hydrogen in the gas from the reservoir and may be performed alone or in combination with one or more other operations depicted in FIG. 3. Operation 310 may be similar to operations 110 or 210.

An operation 312 may include shutting in the well and may be performed alone or in combination with one or more other operations depicted in FIG. 3. Operation 312 may be similar to operations 112 or 212.

If, at 314, in-situ reactors are not communicating (e.g., not in fluid exchange with each other), the next cycle may commence. An operation 316 may include injecting steam into the reservoir and may be performed alone or in combination with one or more other operations depicted in FIG. 3. Operation 316 may be similar to operation 216.

An operation 318 may include shutting in the well and may be performed alone or in combination with one or more other operations depicted in FIG. 3. Operation 318 may be similar to operation 218. The cycle may then be repeated by returning to operation 306. In this way, oxygen injection may begin again and the cycle of operations 306-318 repeated until the end-operation condition at 320 is met.

If, at 314, in-situ reactors are communicating (e.g., in fluid exchange with each other), the operation may end at 320. In this way, after multiple cycles are done of steam-shut in-production and the in-situ reactors are communicating through fluid exchange (fluid is moving from the in-situ reactor or neighborhood (e.g., a region surrounding the well, for example, about 100 m in extent) of one well to the in-situ reactor or neighborhood of the other well), then a group of the wells may be converted to continuous injection of steam or oxygen (e.g., in air or enriched air) or both and a group of other wells are converted to continuous production of fluids. The in-situ reactor may be larger than the depletion zone within the reservoir.

Although FIGS. 1-3 depict example methods 100-300, respectively, and operations thereof, in some implementations, a method illustrated herein may include additional operations, fewer operations, differently arranged operations, or different operations than the operations depicted in FIGS. 1-3. Moreover, or in the alternative, two or more of the operations depicted in FIGS. 1-3 may be performed at least partially in parallel.

Figure 4:
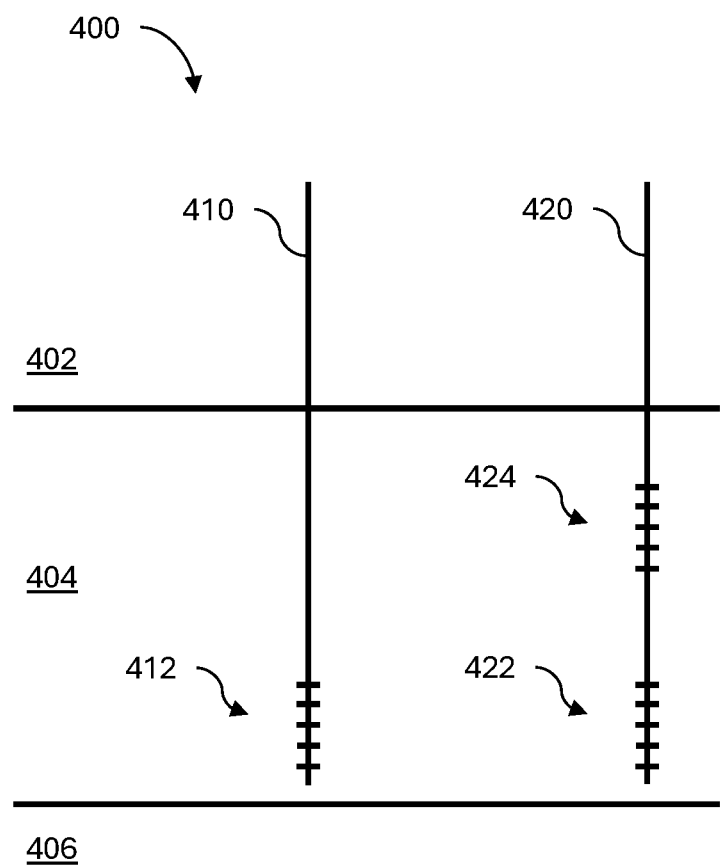
FIG. 4 illustrates a system 400 comprising a vertical well for the production of hydrogen from an oil reservoir, according to one or more implementations herein.

FIG. 4 illustrates a system 400 comprising a vertical well for the production of hydrogen from an oil reservoir, according to one or more implementations herein. In one embodiment of the well architecture of the system 400, a single well is used for both injection and production in a cyclic method. The single well could be, for example, a vertical, deviated, horizontal, or multilateral well. In another implementation of the well architecture of the system 400, a single well may be used with an injection section and a production section in the well. The system 400 may provide for single vertical or deviated well perforation designs. There may be single perforations where injection and production are done or dual injection and production perforations. In implementations with single perforations, the well may be cyclically stimulated, for example, as illustrated in the methods 100-300.

The system 400 may include a well 410 or a well 420 disposed at least partially in a formation. The formation may include an overburden 402, an oil reservoir 404, and understrata 406. The oil reservoir 404 may be situated between the overburden 402 and the understrata 406. The well 410 or the well 420 may be disposed at least partially within the overburden 402 and at least partially within the oil reservoir 404.

The well 410 may include a single well having a single perforation 412. In such a configuration, both injection and production may be effected via the same perforation 412. It will be understood that the system 400 employing the well 410 may include any number of wells 410 such that injection and production may be effected in the system 400.

The well 420 may include a single well having an injection interval perforation 422 separate from a production interval perforation 424. In such a configuration, injection may be effected via the injection interval perforation 422 and production may be effected via the production interval perforation 424. The injection interval perforation 422 and the production interval perforation may be separated by using, for example, a tubing string to the injection section with a packer that separates it from the production section. It will be understood that the system 400 employing the well 420 may include any number of wells 420 such that injection and production may be effected in the system 400.

Figure 5:
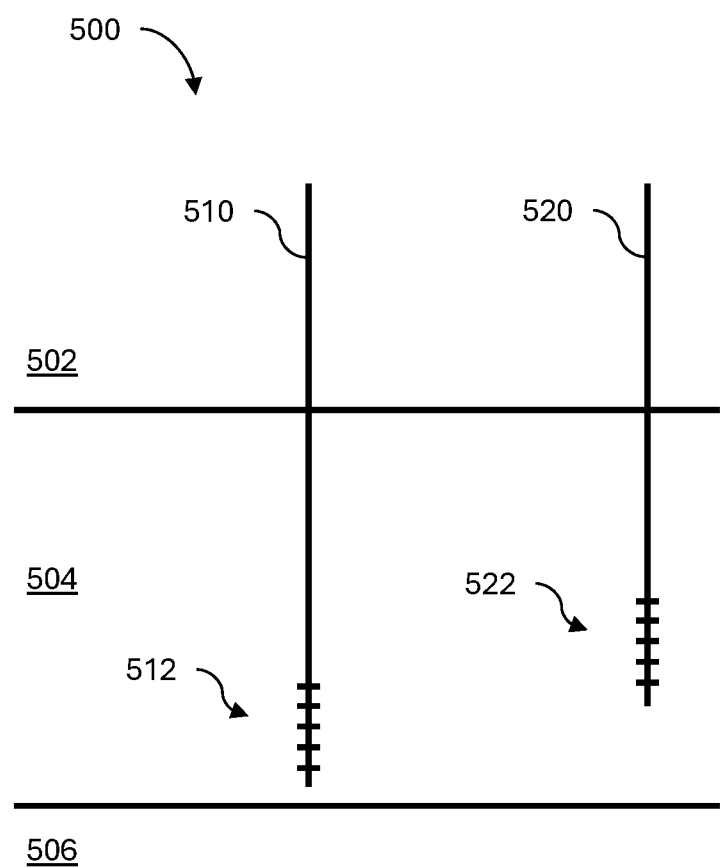
FIG. 5 illustrates a system 500 comprising two vertical wells for the production of hydrogen from an oil reservoir, according to one or more implementations herein.
Figure 6:
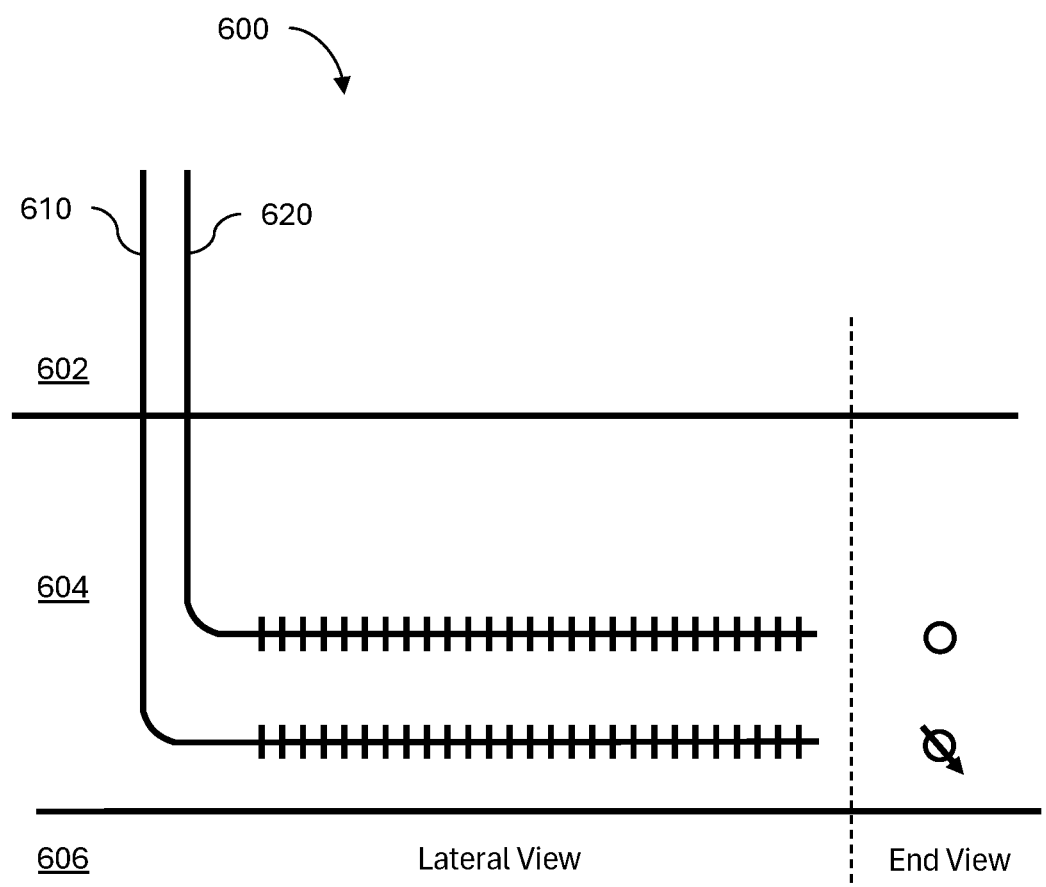
FIG. 6 illustrates a system 600 comprising horizontal wells for the production of hydrogen from an oil reservoir, according to one or more implementations herein.

FIG. 5 illustrates a system 500 comprising two vertical wells for the production of hydrogen from an oil reservoir, according to one or more implementations herein. A well can be used for injection and another well may be used for production, defining an injection-production pair. Such implementations may be in a vertical (or deviated) or horizontal (as illustrated in FIG. 6) configuration. In implementations using two vertical wells, injection and production intervals of the respective wells can be placed at the same elevation or with the injection interval deeper than the production interval.

The system 500 may include an injection well 510 and a production well 520 disposed at least partially in a formation. The formation may include an overburden 502, an oil reservoir 504, and understrata 506. The oil reservoir 504 may be situated between the overburden 502 and the understrata 506. The injection well 510 and the production well 520 may be disposed at least partially within the overburden 502 and at least partially within the oil reservoir 504.

The injection well 510 may include an injection interval perforation 512. The production well 520 may include a production interval perforation 522. It will be understood that the system 500 employing the injection well 510 and the production well 520 may include any number of injection wells 510 and production wells 520 such that injection and production may be effected in the system 500.

The well 510 and the well 520 may be spaced so that thermal communication can be established within, for example, two to three months. Given the thermal diffusivity of oil reservoirs systems, the lateral spacing between the well 510 and the well 520 may be of order of 100 m or less and may, in an exemplary implementation, be 30 m or less.

FIG. 6 illustrates a system 600 comprising horizontal wells for the production of hydrogen from an oil reservoir, according to one or more implementations herein.

The system 600 may include an injection well 610 and a production well 620 disposed at least partially in a formation. The formation may include an overburden 602, an oil reservoir 604, and understrata 606. The oil reservoir 604 may be situated between the overburden 502 and the understrata 606. The injection well 610 and the production well 620 may be disposed at least partially within the overburden 602 and at least partially within the oil reservoir 604.

It will be understood that the system 600 employing the injection well 610 and the production well 620 may include any number of injection wells 610 and production wells 620 such that injection and production may be effected in the system 600.

In implementations where the injection-production pair consists of a pair of horizontal wells, then the injection well can be placed directly below and parallel to the injection well. Alternatively, the injection well can be placed parallel but laterally offset but below the production well. Although not shown, the wells can be placed at a lateral spacing between the horizontal perforations. This spacing, given the thermal diffusivity of oil reservoirs, may be on the order of 100 m or less and in an exemplary implementation, 30 m or less.

Figure 7:
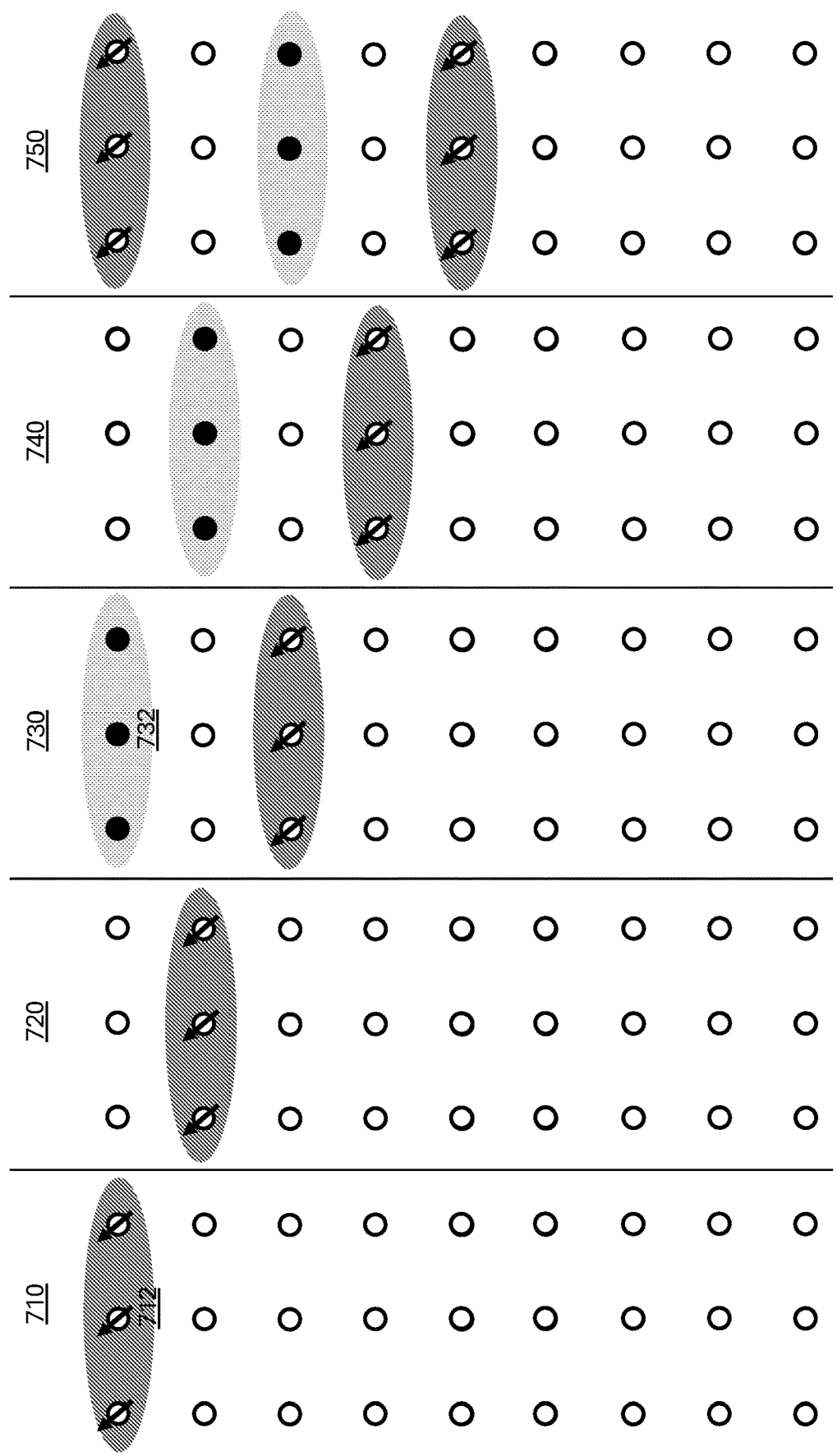
FIG. 7 illustrates a multi-well system 700 comprising an injection subset of the wells is being used for injection and a production subset of wells is being used for production wells, according to one or more implementations herein.

FIG. 7 illustrates a multi-well system 700 comprising an injection subset of the wells is being used for injection and a production subset of wells is being used for production wells, according to one or more implementations herein.

An array of multilateral wells can be used either for the injection well or production well. There may be arrays of injection and production wells arranged within the reservoir where a control strategy is operated to manage the pressure profile within the reservoir. For example, as illustrated in FIG. 7, an aligned series of wells may be used for steam and oxygen injection with neighboring wells used to buffer the pressure build-up that occurs during injection and the wells beyond the neighboring wells being used for production. The wells are then cycled and can be operated in a progressing injection-buffer-production format through the field as illustrated in FIG. 7. This progression can be done on an array of vertical wells or an array of horizontal wells or an array of both. The use of multiple wells enables continuous injection and production over the entire field operation.

The system 700 may include one or more wells, each of which may alternatively be configured or act as a buffer well 702, an injection well 704, or a production well 706. By controlling which configuration each given well is in, a muti-well operation can be realized. It will be understood that while a row-by-row series of operations is presented in FIG. 7 with the array of wells including nine rows of wells with three wells per row, other array dimensions and shapes, or other orders of operation may be employed to achieve the goals of the arrayed multilateral well operation illustrated in FIG. 7.

Prior to a well beginning injection (e.g., operation 106/206/306), it may be pre-heated (e.g., operation 102/202/302) and a depletion zone may be formed (e.g., operation 104/204/304).

At 710, a first row of wells may begin injection (e.g., operation 106/206/306) of its first cycle. A high-pressure zone 712 may form proximate the first row of wells.

At 720, the first row of wells may be shut in (e.g., to soak, operation 108/208/308), and a second row of wells may begin injection (e.g., operation 106/206/306) of its first cycle.

At 730, the first row of wells may begin production (e.g., operation 110/210/310), the second row of wells may be shut in (e.g., to soak, operation 108/208/308), and the third row of wells may begin injection (e.g., operation 106/206/306) of its first cycle. With the first row beginning production, a low-pressure zone 732 may form proximate the first row of wells. Where another high-pressure zone then forms proximate the second group of wells, a pressure gradient may be formed between the new high-pressure zone and the low-pressure zone 732.

At 740, the first row of wells may complete production for its first cycle and be shut in (e.g., operation 112/212/312), thereby completing its first cycle, the second row of wells may be put on production (e.g., operation 110/210/310), the third row of wells may be shut in (e.g., to soak, operation 108/208/308), and the fourth row of wells may begin injection (e.g., operation 106/206/306) of its first cycle.

At 750, the first row of wells may begin injection (e.g., operation 106/206/306) of its second cycle, the second row of wells may be shut in (e.g., operation 112/212/312), thereby completing production for its first cycle, the third row of wells may be put on production (e.g., operation 110/210/310), the fourth row of wells may be shut in (e.g., to soak, operation 108/208/308), and the fifth set of wells may begin injection (e.g., operation 106/206/306) of its first cycle.

This process may be repeated down the array of wells repeating cycles of injection-shut in-production-shut in. After it has been established that fluid exchange is occurring between the wells, then the array may be configured such that injection may be done continuously into a row of wells and production of fluids may be done continuously from another group of wells.

As illustrated in FIG. 7, the injection and production wells are controlled to create high pressure zones (e.g., the high-pressure zone 712) and low-pressure zones (e.g., the low-pressure zone 732) in the reservoir that help to maximize hydrogen-bearing gas production from the system of wells. FIG. 7 illustrates a top view diagram of wells in the field.

Implementations as illustrated in FIG. 7 provide advantages over conventional solutions including that the pressure waves occurring during injection (high pressure in the reservoir) and production (reduced pressure in the reservoir) are controlled within the reservoir. This enables increased production of hydrogen from the reservoir with injection supporting driving generated hydrogen towards the production wells as shown in the last panel of the array of wells in FIG. 7 where the first and fifth rows in injection create high pressure regions in the reservoir that support gas and hydrogen production to the third row of wells.

In another implementation, no buffer wells are used and the injection well rows are directly adjacent to the production well rows.

In another implementation, multiple rows of injection wells and multiple rows of shut-in (e.g., buffer) wells and multiple rows of production wells are used.

In another implementation, steam and oxygen can be simultaneously injected into the reservoir (e.g., operations 206/306 and 216/316) are done at the same time through the same well or different wells In another implementation, the oxygen content of the injected gas can be lower or higher than that of the oxygen content of air. In an exemplary version of this implementation, the oxygen content is equal or higher than that of air.

Figure 8:
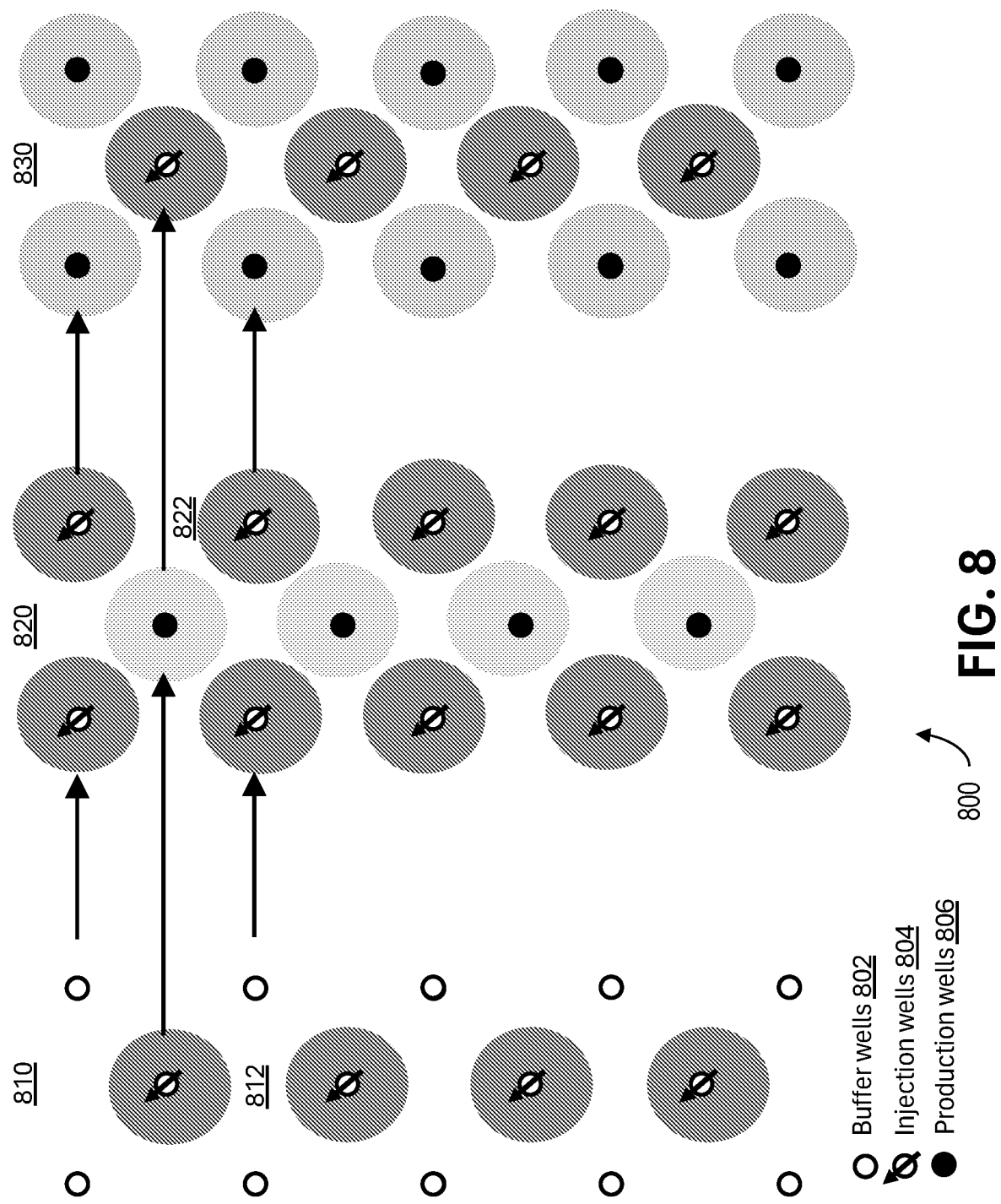
FIG. 8 illustrates another multi-well system 800 comprising a series of five spot patterns used for the wells, according to one or more implementations herein.

FIG. 8 illustrates another multi-well system 800 comprising a series of five spot patterns used for the wells, according to one or more implementations herein. FIG. 8 illustrates a top view diagram of wells in the field. In this implementation, a five-spot pattern for cyclic injection and production is used. It is understood that other well patterns can be used.

The system 800 may include one or more wells, each of which may alternatively be configured or act as a buffer well 802, an injection well 804, or a production well 806. By controlling which configuration each given well is in, a muti-well operation can be realized. It will be understood that while a five-spot pattern of operations is presented in FIG. 8, other pattern dimensions and shapes, or other orders of operation may be employed to achieve the goals of the arrayed multilateral well operation illustrated in FIG. 8.

Prior to a well beginning injection (e.g., operation 106/206/306), it may be pre-heated (e.g., operation 102/202/302) and a depletion zone may be formed (e.g., operation 104/204/304).

At 810, a first group of wells may begin injection (e.g., operation 106/206/306) of its first cycle. A high-pressure zone 812 may form proximate the first group of wells.

At 820, the first group of wells may begin production (e.g., operation 110/210/310) or, alternatively, first be shut in (e.g., to soak, operation 108/208/308), and a second group of wells may begin injection (e.g., operation 106/206/306) of its first cycle. A low-pressure zone 822 may form proximate the first group of wells. Where another high-pressure zone then forms proximate the second group of wells, a pressure gradient may be formed between the new high-pressure zone and the low-pressure zone 822.

At 830, the first group of wells may begin injection (e.g., operation 106/206/306) of its second cycle, or, alternatively, first be shut in (e.g., operation 112/212/312), and the second group of wells may begin production (e.g., operation 110/210/310) or, alternatively, first be shut in (e.g., to soak, operation 108/208/308).

In the implementation illustrated in FIG. 8, a five-spot pattern is used. The method (e.g., method 100/200/300) can be applied in any regular or irregular array of wells, for example seven-spot patterns or regular arrays of horizontal wells, where a sequence of injection-shut in-production wells are used. The injection and production wells may be controlled to create high- and low-pressure zones in the reservoir that help to maximize hydrogen-bearing gas production from the system of wells.

Figure 9A:
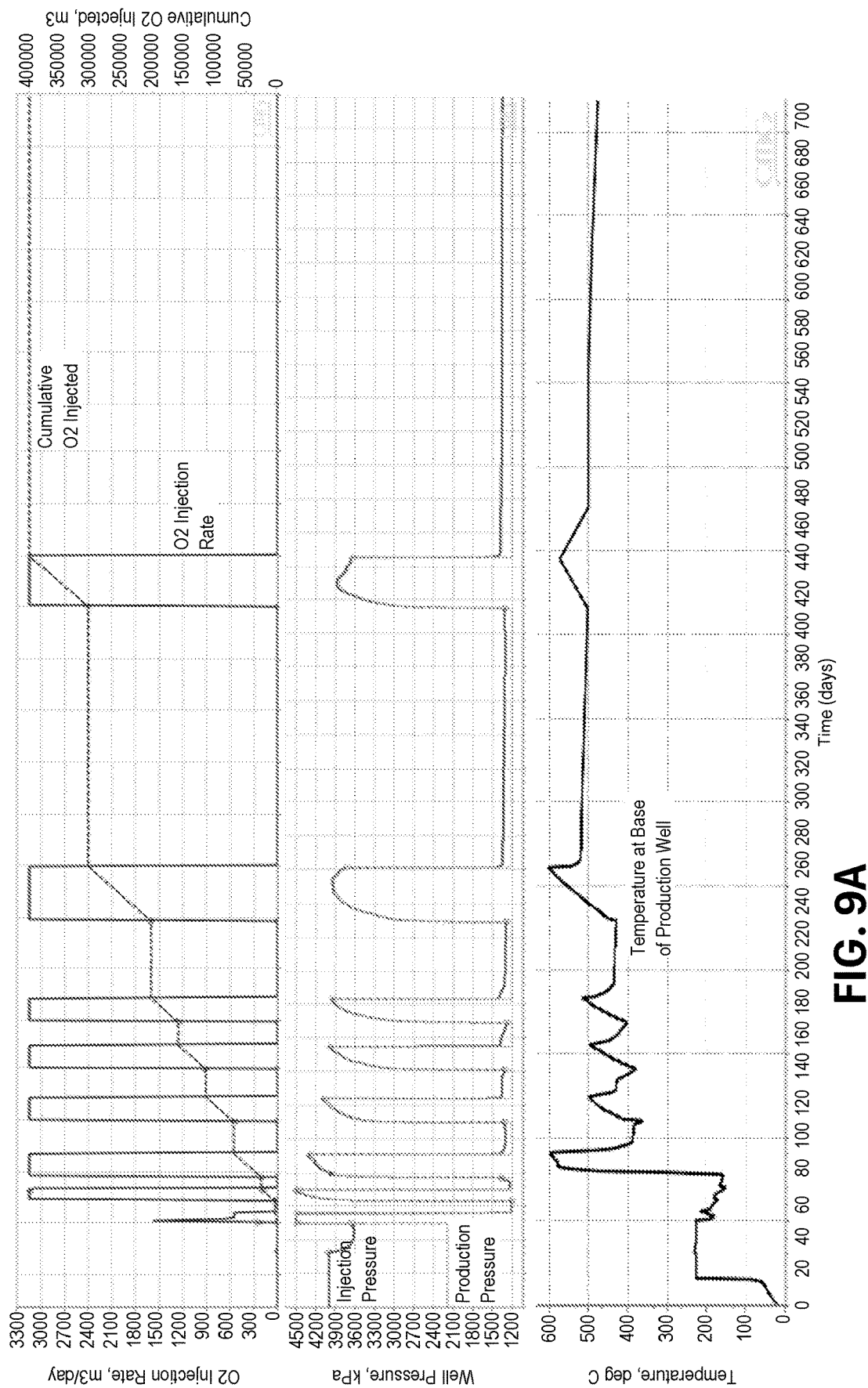
FIG. 9A and FIG. 9B together are a presentation of results of a thermal-reactive reservoir simulation model of a heavy oil reservoir undergoing production of hydrogen from an oil reservoir, according to one or more implementations herein.
Figure 9B:
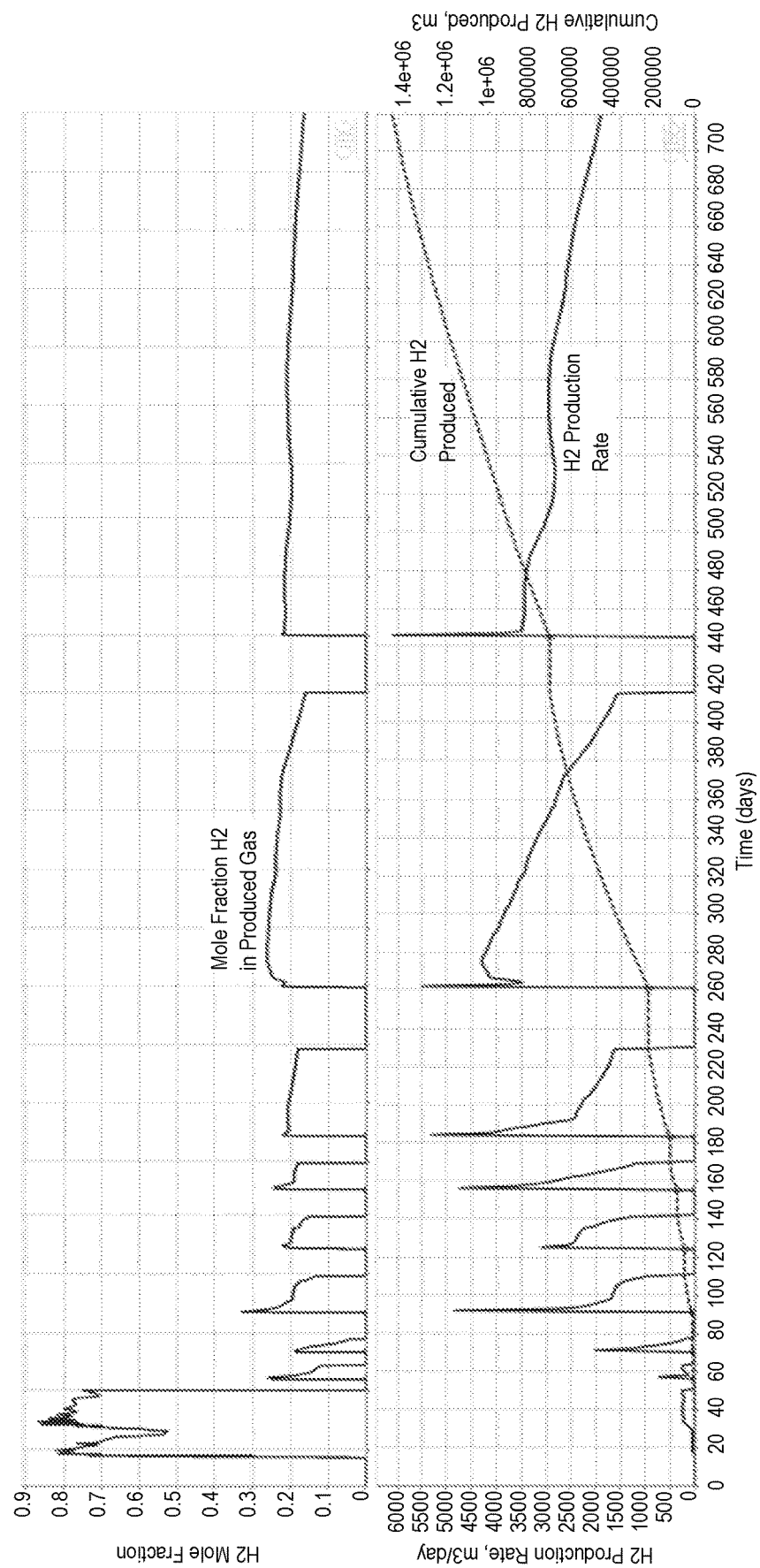

FIG. 9A and FIG. 9B together are a presentation of results of a thermal-reactive reservoir simulation model of a heavy oil reservoir undergoing production of hydrogen from an oil reservoir, according to one or more implementations herein. FIG. 9A and FIG. 9B display an example of results of using method 100 for a single vertical well in a heavy oil reservoir with typical heavy oil reservoir properties (e.g., porosity 0.3, permeability 5D, oil saturation 0.7, ~20 m oil column, ~8 m bottom water, 14° API heavy oil, depth ~700 m). The results demonstrate a steam start-up stage of 50 days and eight cycles of air injection and fluid production. The results show that during injection the pressure rises and on production it drops. In Cycles 7 and 8, the pressure profile peaks (in some implementations it is preferred that the injection cycle is stopped when the pressure peaks). Similar to pressure, the temperature at base of production well cycles according to the oxygen injection cycles-during oxygen (e.g., in air or enriched air) injection, the temperature rises due to combustion reactions occurring within the reservoir and during production (e.g., when air injection is stopped) the temperature declines demonstrating that pressure and temperature can be used as signals for controlling the injection and production cycle lengths. The produced gas, after oxygen (in air) injection, comprises approximately a 20% mole fraction hydrogen. The hydrogen production profile reveals that after oxygen (e.g., in air or enriched air) injection in each cycle, the rate and amount of hydrogen produced rises in each consequent cycle. At the end of the eight-cycle operation, the cumulative oxygen to hydrogen ratio for this operation is equal to 1.76 tonnes O2 injected per tonne $H_2$ produced.

Figure 10:
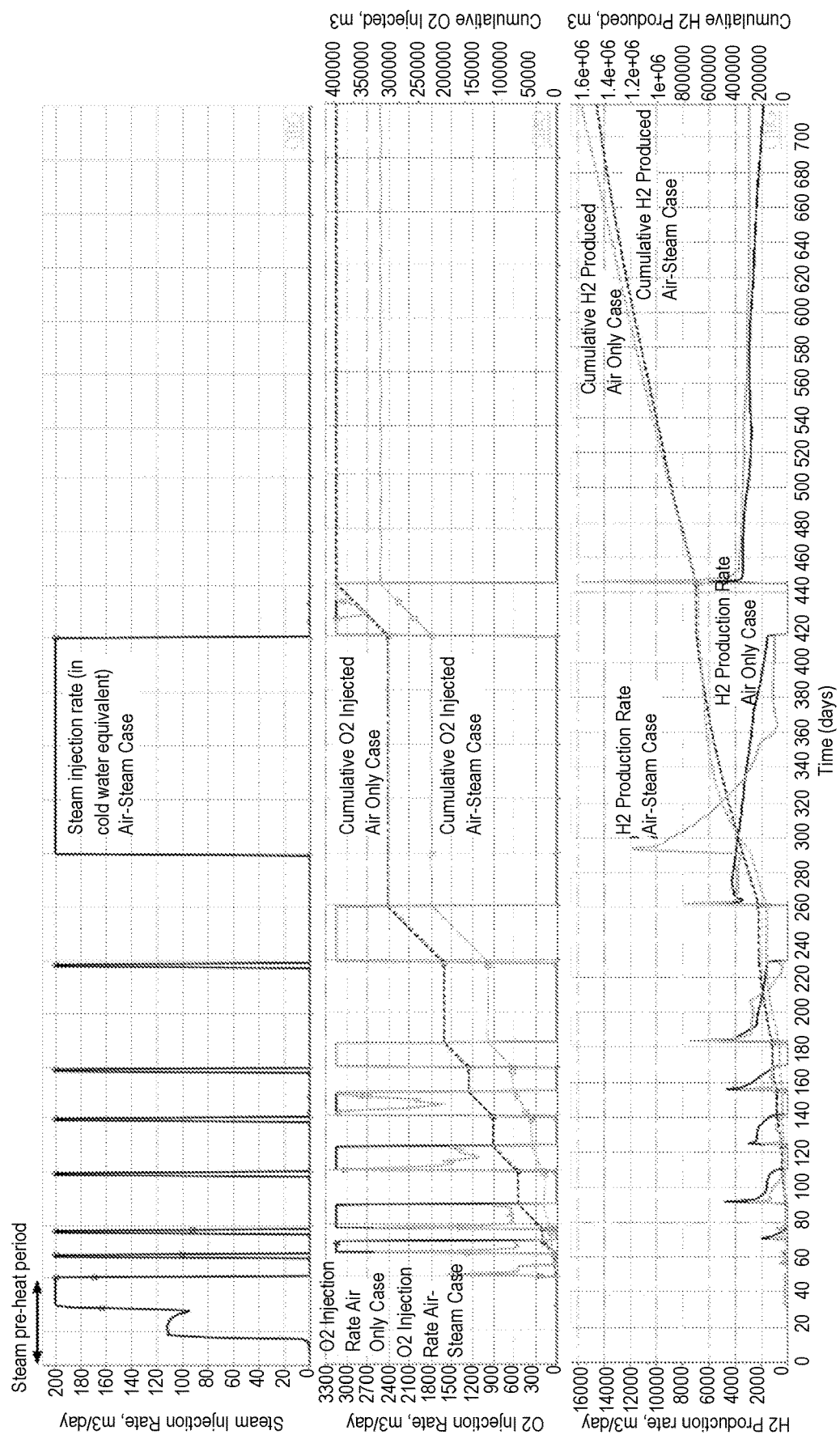
FIG. 10 is a presentation of results of a thermal-reactive reservoir simulation model of a heavy oil reservoir undergoing production of hydrogen from an oil reservoir, according to one or more implementations herein.

FIG. 10 is a presentation of results of a thermal-reactive reservoir simulation model of a heavy oil reservoir undergoing production of hydrogen from an oil reservoir, according to one or more implementations herein. FIG. 10 displays an example of results where a steam injection period is done just before each oxygen (in air) injection period in each cycle. The results show that the addition of steam at the start of each cycle results in lower oxygen (e.g., in air or enriched air) injection rate and cumulative volume injected, implying lower costs for oxygen (e.g., in air or enriched air) injection, and yields greater hydrogen production rate during portions of the production intervals in the cycles as well as overall greater amount of hydrogen volume produced. At the end of the eight-cycle operation, the cumulative oxygen to hydrogen ratio for this operation is equal to 1.30 tonnes O2 injected per tonne $H_2$ produced.

The following clauses may provide additional context for the present disclosure but should be taken in no way as limiting.

Clause 1. A method for treating a reservoir to recover a hydrogen-bearing gas, comprising: providing a well passing through a surface of the earth into a reservoir of a formation; in a pre-heat stage: pre-heating the reservoir by injecting a heating fluid into the well; and producing pre-production fluids from the reservoir to yield a depletion chamber within the reservoir; in an injection stage: injecting an oxygen-bearing gas via the well and the depletion chamber into the reservoir to yield an in-situ reactor zone where hydrocarbons including oil and gas are combusted to generate heat, steam, and carbon oxide gas components; maintaining conditions for hydrogen-generating reactions, including one or more of gasification reactions, steam-reforming reactions, water-gas shift reactions, and aquathermolysis reactions to occur in the reservoir, thereby generating hydrogen; and stopping injection of the oxygen-bearing gas; in a soak stage: shutting in the well; and allowing remaining oxygen in the reservoir to be consumed and the hydrogen-generating reactions to continue, thereby continuing to generate hydrogen; and in a production stage: producing production fluids via the well to the surface including a hydrogen-bearing gas comprising the generated hydrogen; continuing production through the well until a production rate of the hydrogen-bearing gas has dropped below a target rate; and shutting in the well.

Clause 2. The method of clause 1, wherein the injection stage, the soak stage, and the production stage are repeated in one or more cycles.

Clause 3. The method of any of clauses 1-2, wherein the generated hydrogen is maintained in a portion of the formation proximate the well during the soak stage, such that the generated hydrogen is readily producible from the portion of the formation proximate the well.

Clause 4. The method of any of clauses 1-3, wherein a temperature of the oxygen-bearing gas is elevated prior to injection into the reservoir.

Clause 5. The method of any of clauses 1-5, wherein the well is one of a plurality of wells passing through the surface into the reservoir and an operation of the plurality of wells is coordinated to control a pressure within the reservoir, thereby enhancing the production of the hydrogen-bearing gas from one or more of the wells.

Clause 6. The method of any of clauses 1-5, wherein one or both of the heating fluid or oxygen-bearing gas is injected into one or more well of the plurality of wells to form a high pressure connected zone within the reservoir.

Clause 7. The method of clause 6, wherein producing production fluids from one or more well of the plurality of wells forms a low pressure connected zone within the reservoir, thereby creating a pressure gradient between the high pressure connected zone and the low pressure connected zone, thereby enhancing hydrogen production from the reservoir.

Clause 8. The method of any of clauses 5-6, wherein upon establishing fluid communication between at least two wells of the plurality of wells, one of the two wells of the plurality of wells is configured for continuous injection of the heating fluid or the oxygen-bearing gas and the other of the two wells of the plurality of wells is configured for continuous production of the production fluids.

Clause 9. The method of any of clauses 1-8, wherein the oxygen-bearing gas comprises an oxidant.

Clause 10. The method of clause 9, wherein the oxidant comprises nitrous oxide.

Clause 11. The method of any of clauses 9-10, wherein the oxidant comprises hydrogen peroxide.

Clause 12. The method of any of clauses 1-11, wherein the heating fluid comprises steam.

Clause 13. The method of clause 12, wherein the heating fluid further comprises hot water.

Clause 14. The method of any of clauses 1-13, wherein the heating fluid comprises hot water.

Clause 15. The method of any of clauses 1-14, wherein the well comprises a vertical well.

Clause 16. The method of any of clauses 1-15, wherein the well comprises a deviated well.

Clause 17. The method of any of clauses 1-16, wherein the well comprises a horizontal well.

Clause 18. The method of any of clauses 1-17, wherein the well comprises a multilateral well.

Clause 19. The method of any of clauses 1-18, wherein a thermocouple configured to monitor a temperature of the well or fluids therein is disposed within the well.

Clause 20. The method of any of clauses 1-19, wherein the heating fluid is injected into the well until a temperature of the well is at least a pre-heat temperature.

Clause 21. The method of clause 20, wherein the pre-heat temperature is 40% of a temperature of the heating fluid.

Clause 22. The method of any of clauses 20-21, wherein the pre-heat temperature is 60% of a temperature of the heating fluid.

Clause 23. The method of any of clauses 1-22, wherein the injection of the oxygen-bearing gas is stopped when a measured temperature reaches a running temperature.

Clause 24. The method of clause 23, wherein the measured temperature comprises a temperature measured internal to the well.

Clause 25. The method of clause 23, wherein the measured temperature comprises a temperature measured proximate the well.

Clause 26. The method of any of clauses 22-25, wherein the running temperature is the lesser of 400° C. and 200° C. above a temperature of the heating fluid.

Clause 27. The method of any of clauses 1-26, wherein the soak stage includes allowing the remaining oxygen in the reservoir to be consumed and the hydrogen-generating reactions to continue until a temperature of the well decreases to a soak temperature.

Clause 28. The method of clause 27, wherein the soak temperature is the higher of 300° C. or 50° C. below a peak temperature of the well during the injection stage.

Clause 29. The method of any of clauses 1-28, wherein the injection of the oxygen-bearing gas is stopped when a pressure of the well reaches a peak pressure.

Clause 30. The method of any of clauses 1-29, wherein the reservoir comprises an oil reservoir.

Clause 31. The method of any of clauses 1-30, wherein the reservoir comprises a gas reservoir.

Clause 32. The method of any of clauses 1-31, wherein providing the well includes drilling the well.

Clause 33. A system for treating a reservoir to recover a hydrogen-bearing gas, comprising: a well passing through a surface of the earth into a reservoir of a formation; and a heating fluid source in fluid communication with the well and configured to supply a heating fluid to the well; wherein the system is configured to perform a method comprising: in a pre-heat stage: pre-heating the reservoir by injecting a heating fluid into the well; and producing pre-production fluids from the reservoir to yield a depletion chamber within the reservoir; in an injection stage: injecting an oxygen-bearing gas via the well and the depletion chamber into the reservoir to yield an in-situ reactor zone where hydrocarbons including oil and gas are combusted to generate heat, steam, and carbon oxide gas components; maintaining conditions for hydrogen-generating reactions, including one or more of gasification reactions, steam-reforming reactions, water-gas shift reactions, and aquathermolysis reactions to occur in the reservoir, thereby generating hydrogen; and stopping injection of the oxygen-bearing gas; in a soak stage: shutting in the well; and allowing remaining oxygen in the reservoir to be consumed and the hydrogen-generating reactions to continue, thereby continuing to generate hydrogen; and in a production stage: producing production fluids via the well to the surface including a hydrogen-bearing gas comprising the generated hydrogen; continuing production through the well until a production rate of the hydrogen-bearing gas has dropped below a target rate; and shutting in the well.

Clause 34. The system of clause 33, wherein the injection stage, the soak stage, and the production stage are repeated in one or more cycles.

Clause 35. The system of any of clauses 33-34, wherein the generated hydrogen is maintained in a portion of the formation proximate the well during the soak stage, such that the generated hydrogen is readily producible from the portion of the formation proximate the well.

Clause 36. The system of any of clauses 33-35, wherein a temperature of the oxygen-bearing gas is elevated prior to injection into the reservoir.

Clause 37. The system of any of clauses 33-36, wherein the well is one of a plurality of wells passing through the surface into the reservoir and an operation of the plurality of wells is coordinated to control a pressure within the reservoir, thereby enhancing the production of the hydrogen-bearing gas from one or more of the wells.

Clause 38. The system of clause 37, wherein one or both of the heating fluid or oxygen-bearing gas is injected into one or more well of the plurality of wells to form a high pressure connected zone within the reservoir.

Clause 39. The system of clause 38, wherein producing production fluids from one or more well of the plurality of wells forms a low pressure connected zone within the reservoir, thereby creating a pressure gradient between the high pressure connected zone and the low pressure connected zone, thereby enhancing hydrogen production from the reservoir.

Clause 40. The system of any of clauses 37-39, wherein upon establishing fluid communication between at least two wells of the plurality of wells, one of the two wells of the plurality of wells is configured for continuous injection of the heating fluid or the oxygen-bearing gas and the other of the two wells of the plurality of wells is configured for continuous production of the production fluids.

Clause 41. The system of any of clauses 33-40, wherein the oxygen-bearing gas comprises an oxidant.

Clause 42. The system of clause 41, wherein the oxidant comprises nitrous oxide.

Clause 43. The system of any of clauses 41-42, wherein the oxidant comprises hydrogen peroxide.

Clause 44. The system of any of clauses 33-43, wherein the heating fluid comprises steam.

Clause 45. The system of any of clauses 33-44, wherein the heating fluid further comprises hot water.

Clause 46. The system of any of clauses 33-45, wherein the heating fluid comprises hot water.

Clause 47. The system of any of clauses 33-46, wherein the well comprises a vertical well.

Clause 48. The system of any of clauses 33-47, wherein the well comprises a deviated well.

Clause 49. The system of any of clauses 33-48, wherein the well comprises a horizontal well.

Clause 50. The system of any of clauses 33-49, wherein the well comprises a multilateral well.

Clause 51. The system of any of clauses 33-50, further comprising a thermocouple configured to monitor a temperature of the well or fluids therein disposed within the well.

Clause 52. The system of any of clauses 33-51, wherein the heating fluid is injected into the well until a temperature of the well is at least a pre-heat temperature.

Clause 53. The system of clause 52, wherein the pre-heat temperature is 40% of a temperature of the heating fluid.

Clause 54. The system of clause 52, wherein the pre-heat temperature is 60% of a temperature of the heating fluid.

Clause 55. The system of any of clauses 33-54, wherein the injection of the oxygen-bearing gas is stopped when a measured temperature reaches a running temperature.

Clause 56. The system of clause 55, wherein the measured temperature comprises a temperature measured internal to the well.

Clause 57. The system of clause 55, wherein the measured temperature comprises a temperature measured proximate the well.

Clause 58. The system of any of clauses 33-57, wherein the running temperature is the lesser of 400° C. and 200° C. above a temperature of the heating fluid.

Clause 59. The system of any of clauses 33-58, wherein the soak stage includes allowing the remaining oxygen in the reservoir to be consumed and the hydrogen-generating reactions to continue until a temperature of the well decreases to a soak temperature.

Clause 60. The system of clause 59, wherein the soak temperature is the higher of 300° C. or 50° C. below a peak temperature of the well during the injection stage.

Clause 61. The system of any of clauses 33-60, wherein the injection of the oxygen-bearing gas is stopped when a pressure of the well reaches a peak pressure.

Clause 62. The system of any of clauses 33-61, wherein the reservoir is an oil reservoir.

Clause 63. The system of any of clauses 33-62, wherein the reservoir is a gas reservoir.

Clause 64. The system of any of clauses 33-63, wherein providing the well includes drilling the well.

Clause 65. A system for treating a reservoir to recover a hydrogen-bearing gas, comprising: a plurality of wells, each well passing through a surface of the earth into a reservoir of a formation and configured for coordinated operation; and a heating fluid source in fluid communication with the well and configured to supply a heating fluid to the well; wherein the system is configured to perform a method comprising, with one or more well of the plurality of wells: in a pre-heat stage: pre-heating the reservoir by injecting a heating fluid into the well; and producing pre-production fluids from the reservoir to yield a depletion chamber within the reservoir; in an injection stage: injecting an oxygen-bearing gas via the well and the depletion chamber into the reservoir to yield an in-situ reactor zone where hydrocarbons including oil and gas are combusted to generate heat, steam, and carbon oxide gas components; maintaining conditions for hydrogen-generating reactions, including one or more of gasification reactions, steam-reforming reactions, water-gas shift reactions, and aquathermolysis reactions to occur in the reservoir, thereby generating hydrogen; and stopping injection of the oxygen-bearing gas; in a soak stage: shutting in the well; and allowing remaining oxygen in the reservoir to be consumed and the hydrogen-generating reactions to continue, thereby continuing to generate hydrogen; and in a production stage: producing production fluids via the well to the surface including a hydrogen-bearing gas comprising the generated hydrogen; continuing production through the well until a production rate of the hydrogen-bearing gas has dropped below a target rate; and shutting in the well; wherein the heating fluid or the oxygen-bearing gas is injected to form a high pressure connected zone within the reservoir; and wherein producing production fluids forms a low pressure connected zone within the reservoir, thereby creating a pressure gradient between the high pressure connected zone and the low pressure connected zone and enhancing hydrogen production from the reservoir.

Various characteristics, advantages, implementations, embodiments, and/or examples relating to the invention have been described in the foregoing description with reference to the accompanying drawings. However, the above description and drawings are illustrative only. The invention is not limited to the illustrated implementations, embodiments, and/or examples, and all implementations, embodiments, and/or examples of the invention need not necessarily achieve every advantage or purpose, or possess every characteristic, identified herein. Accordingly, various changes, modifications, or omissions may be effected by one skilled in the art without departing from the scope or spirit of the invention, which is limited only by the appended claims. Although example materials and dimensions have been provided, the invention is not limited to such materials or dimensions unless specifically required by the language of a claim. Elements and uses of the above-described implementations, embodiments, and/or examples can be rearranged and combined in manners other than specifically described above, with any and all permutations within the scope of the invention, as limited only by the appended claims.

In the claims, various portions are prefaced with letter or number references for convenience. However, use of such references does not imply a temporal or ordered relationship not otherwise required by the language of the claims. Unless the phrase 'means for' or 'step for' appears in a particular claim or claim limitation, such claim or sample claim limitation should not be interpreted to invoke 35 U.S.C. § 112 (f).

As used in the specification and in the claims, use of "and" to join elements in a list forms a group of all elements of the list. For example, a list described as comprising A, B, and C defines a list that includes A, includes B, and includes C. As used in the specification and in the claims, use of "or" to join elements in a list forms a group of at least one element of the list. For example, a list described as comprising A, B, or C defines a list that may include A, may include B, may include C, may include any subset of A, B, and C, or may include A, B, and C. Unless otherwise stated, lists herein are inclusive, that is, lists are not limited to the stated elements and may be combined with other elements not specifically stated in a list. As used in the specification and in the claims, the singular form of 'a', 'an', and 'the' include plural referents (e.g., one or more of the referent) unless the context clearly dictates otherwise.

It is to be expressly understood that the drawings are for the purpose of illustration and description only and are not intended as a definition of the limits of the invention.

It is to be expressly understood that the drawings are for the purpose of illustration and description only and are not intended as a definition of the limits of the invention.

Unless otherwise stated, any range of values disclosed herein sets out a lower limit value and an upper limit value, and such ranges include all values and ranges between and including the limit values of the stated range, and all values and ranges substantially within the stated range as defined by the order of magnitude of the stated range.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. A method for treating a reservoir to recover a hydrogen-bearing gas, comprising:
   providing a well passing through a surface of the earth into a reservoir of a formation;
   in a pre-heat stage:
      pre-heating the reservoir by injecting a heating fluid into the well; and
      producing pre-production fluids from the reservoir to yield a depletion chamber within the reservoir;
   in an injection stage:
      injecting an oxygen-bearing gas via the well and the depletion chamber into the reservoir to yield an in-situ reactor zone where hydrocarbons including oil and gas are combusted to generate heat, steam, and carbon oxide gas components;
      maintaining conditions for hydrogen-generating reactions, including one or more of gasification reactions, steam-reforming reactions, water-gas shift reactions, and aquathermolysis reactions to occur in the reservoir, thereby generating hydrogen; and
      stopping injection of the oxygen-bearing gas;
   in a soak stage:
      shutting in the well; and
      allowing remaining oxygen in the reservoir to be consumed and the hydrogen-generating reactions to continue, thereby continuing to generate hydrogen; and
   in a production stage:
      producing production fluids via the well to the surface including a hydrogen-bearing gas comprising the generated hydrogen;
      continuing production through the well until a production rate of the hydrogen-bearing gas has dropped below a target rate; and
      shutting in the well.

2. The method of claim 1, wherein the injection stage, the soak stage, and the production stage are repeated in one or more cycles.

3. The method of claim 1, wherein the generated hydrogen is maintained in a portion of the formation proximate the well during the soak stage, such that the generated hydrogen is readily producible from the portion of the formation proximate the well.

4. The method of claim 1, wherein a temperature of the oxygen-bearing gas is elevated prior to injection into the reservoir.

5. The method of claim 1, wherein the well is one of a plurality of wells passing through the surface into the reservoir and an operation of the plurality of wells is coordinated to control a pressure within the reservoir, thereby enhancing the production of the hydrogen-bearing gas from one or more of the wells.

6. The method of claim 5, wherein one or both of the heating fluid or oxygen-bearing gas is injected into one or more well of the plurality of wells to form a high pressure connected zone within the reservoir.

7. The method of claim 6, wherein producing production fluids from one or more well of the plurality of wells forms a low pressure connected zone within the reservoir, thereby creating a pressure gradient between the high pressure connected zone and the low pressure connected zone, thereby enhancing hydrogen production from the reservoir.

8. The method of claim 5, wherein upon establishing fluid communication between at least two wells of the plurality of wells, one of the two wells of the plurality of wells is configured for continuous injection of the heating fluid or the oxygen-bearing gas and the other of the two wells of the plurality of wells is configured for continuous production of the production fluids.

9. The method of claim 1, wherein the oxygen-bearing gas comprises an oxidant, nitrous oxide, or hydrogen peroxide.

10. The method of claim 1, wherein a thermocouple configured to monitor a temperature of the well or fluids therein is disposed within the well.

11. The method of claim 1, wherein the heating fluid is injected into the well until a temperature of the well is at least a pre-heat temperature.

12. The method of claim 11, wherein the pre-heat temperature is equal to or greater than 40% of a temperature of the heating fluid.

13. The method of claim 1, wherein the injection of the oxygen-bearing gas is stopped when a measured temperature reaches a running temperature.

14. The method of claim 13, wherein the running temperature is the lesser of 400° C. and 200° C. above a temperature of the heating fluid.

15. The method of claim 1, wherein the soak stage includes allowing the remaining oxygen in the reservoir to be consumed and the hydrogen-generating reactions to continue until a temperature of the well decreases to a soak temperature.

16. The method of claim 15, wherein the soak temperature is the higher of 300° C. or 50° C. below a peak temperature of the well during the injection stage.

17. The method of claim 1, wherein the injection of the oxygen-bearing gas is stopped when a pressure of the well reaches a peak pressure.

18. A system for treating a reservoir to recover a hydrogen-bearing gas, comprising:
    a well passing through a surface of the earth into a reservoir of a formation; and
    a heating fluid source in fluid communication with the well and configured to supply a heating fluid to the well;
    wherein the system is configured to perform a method comprising:
        in a pre-heat stage:
            pre-heat the reservoir by injecting a heating fluid into the well; and
            produce pre-production fluids from the reservoir to yield a depletion chamber within the reservoir;
        in an injection stage:
            inject an oxygen-bearing gas via the well and the depletion chamber into the reservoir to yield an in-situ reactor zone where hydrocarbons including oil and gas are combusted to generate heat, steam, and carbon oxide gas components;
            maintain conditions for hydrogen-generating reactions, including one or more of gasification reactions, steam-reforming reactions, water-gas shift reactions, and aquathermolysis reactions to occur in the reservoir, thereby generating hydrogen; and
            stop injection of the oxygen-bearing gas;
        in a soak stage:
            shut in the well; and
            allow remaining oxygen in the reservoir to be consumed and the hydrogen-generating reactions to continue, thereby continuing to generate hydrogen; and
        in a production stage:
            produce production fluids via the well to the surface including a hydrogen-bearing gas comprising the generated hydrogen;
            continue production through the well until a production rate of the hydrogen-bearing gas has dropped below a target rate; and
            shut in the well.

19. The system of claim 18, wherein the well comprises a vertical well, a deviated well, a horizontal well, or a multilateral well.

20. A system for treating a reservoir to recover a hydrogen-bearing gas, comprising:
    a plurality of wells, each well passing through a surface of the earth into a reservoir of a formation and configured for coordinated operation; and
    a heating fluid source in fluid communication with the well and configured to supply a heating fluid to the well;
    wherein the system is configured to perform a method comprising, with one or more well of the plurality of wells:
        in a pre-heat stage:
            pre-heat the reservoir by injecting a heating fluid into the well; and
            produce pre-production fluids from the reservoir to yield a depletion chamber within the reservoir;
        in an injection stage:
            inject an oxygen-bearing gas via the well and the depletion chamber into the reservoir to yield an in-situ reactor zone where hydrocarbons including oil and gas are combusted to generate heat, steam, and carbon oxide gas components;
            maintain conditions for hydrogen-generating reactions, including one or more of gasification reactions, steam-reforming reactions, water-gas shift reactions, and aquathermolysis reactions to occur in the reservoir, thereby generating hydrogen; and
            stop injection of the oxygen-bearing gas;
        in a soak stage:
            shut in the well; and
            allow remaining oxygen in the reservoir to be consumed and the hydrogen-generating reactions to continue, thereby continuing to generate hydrogen; and
        in a production stage:
            produce production fluids via the well to the surface including a hydrogen-bearing gas comprising the generated hydrogen;
            continue production through the well until a production rate of the hydrogen-bearing gas has dropped below a target rate; and
            shutting in the well;
    wherein the heating fluid or the oxygen-bearing gas is injected to form a high pressure connected zone within the reservoir; and
    wherein producing production fluids forms a low pressure connected zone within the reservoir, thereby creating a pressure gradient between the high pressure connected zone and the low pressure connected zone and enhancing hydrogen production from the reservoir.

* * * * *